United States Patent [19]

Jeffries, Jr.

[11] E Patent Number: Re. 32,096

[45] Reissued Date of Patent: Mar. 25, 1986

[54] END BLOCK

[75] Inventor: Ernest H. Jeffries, Jr., Greensboro, N.C.

[73] Assignee: Resco Products, Inc., Norristown, Pa.

[21] Appl. No.: 586,373

[22] Filed: Mar. 5, 1984

Related U.S. Patent Documents

Reissue of:

[64] Patent No.: 4,320,612
Issued: Mar. 23, 1982
Appl. No.: 178,249
Filed: Aug. 15, 1980

U.S. Applications:

[62] Division of Ser. No. 15,038, Feb. 26, 1979, Pat. No. 4,243,385.

[51] Int. Cl.[4] ..... E27D 3/12; E04C 1/10; E04C 1/30

[52] U.S. Cl. ..... 52/396; 52/595; 110/338; 432/241

[58] Field of Search ..... 52/396, 403, 506, 573, 52/595; 49/381, 383; 110/173 R, 338

[56] References Cited

U.S. PATENT DOCUMENTS

| | | | |
|---|---|---|---|
| 379,040 | 3/1888 | Anderson . | |
| 711,541 | 10/1902 | Standau | 52/603 |
| 868,838 | 10/1907 | Brewington . | |
| 1,072,302 | 9/1913 | Boss . | |
| 1,088,040 | 2/1914 | Stanton . | |
| 1,162,409 | 11/1915 | Shimer . | |
| 1,325,079 | 12/1919 | Coggan | 52/595 X |
| 1,330,249 | 2/1920 | Emley . | |
| 1,410,729 | 3/1922 | Balz . | |
| 1,485,110 | 2/1924 | Beth | 432/241 X |
| 1,673,640 | 6/1928 | Rau | 52/396 |
| 1,925,103 | 9/1933 | Loftus . | |
| 1,936,151 | 11/1933 | Allen, Jr. et al. | 52/573 X |
| 2,047,227 | 7/1936 | Robinson | 52/396 |
| 2,075,863 | 4/1937 | Nash . | |
| 2,107,762 | 2/1938 | Olds | 110/173 R |
| 2,411,477 | 11/1946 | Straight | 52/396 |
| 2,687,034 | 8/1954 | Blanc . | |
| 2,904,144 | 9/1959 | Moore | 52/403 |
| 2,962,131 | 11/1960 | Rossi | 52/573 |
| 3,012,377 | 12/1961 | Sunnkjian | 52/595 X |
| 3,035,323 | 5/1962 | Robson | 432/241 |
| 3,077,250 | 2/1963 | Goldberg | 49/489 X |
| 3,077,703 | 2/1963 | Bergstrom . | |
| 3,363,324 | 1/1958 | Martin . | |
| 3,435,578 | 4/1969 | Taylor et al. | 52/396 |
| 3,526,071 | 9/1970 | Watanabe | 52/403 |
| 3,535,838 | 10/1970 | Hoff | 52/436 X |
| 3,982,369 | 9/1976 | Keleske . | |
| 4,003,172 | 1/1977 | Pawl . | |
| 4,086,737 | 5/1978 | Byrd, Jr. . | |
| 4,111,405 | 9/1978 | Kelis et al. | 49/370 X |
| 4,194,282 | 3/1980 | Byrd, Jr. | 52/509 X |
| 4,243,385 | 1/1981 | Jeffries, Jr. | 52/227 X |

FOREIGN PATENT DOCUMENTS

| | | | |
|---|---|---|---|
| 188721 | 9/1907 | Fed. Rep. of Germany | 52/436 |
| 836091 | 4/1952 | Fed. Rep. of Germany | 52/436 |
| 736303 | 9/1932 | France | 110/173 R |
| 462219 | 3/1951 | Italy | 52/436 |
| 154737 | 8/1932 | Switzerland | 52/436 |
| 524980 | 8/1940 | United Kingdom | 110/173 R |

*Primary Examiner*—Alfred C. Perham
*Attorney, Agent, or Firm*—Seidel, Gonda, Goldhammer & Abbott

[57] ABSTRACT

An end block adapted for use on a kiln car includes a refractory body having a transverse projection at a front end and a transverse recess at a rear end. The recess is dimensioned to receive therewithin a projection on the front end of another block with a loose fit therebetween. A sealing layer of resilient refractory material may be disposed within the recess for contact with the front end projection of another block.

11 Claims, 3 Drawing Figures

END BLOCK

Matter enclosed in heavy brackets [ ] appears in the original patent but forms no part of this reissue specification; matter printed in italics indicates the additions made by reissue.

CROSS REFERENCE TO RELATED APPLICATIONS

This application is a division of application Ser. No. 15,038, field Feb. 26, 1979, now U.S. Pat. No. 4,243,385.

BACKGROUND OF THE INVENTION

This invention relates to end blocks adapted to be disposed along the leading and trailing edges of a kiln car. These blocks are sometimes referred to as end seal blocks. Ceramic and/or refractory goods are usually loaded onto kiln cars and transported by the cars through a kiln to be dried or fired. The kilns are generally heated from the top or side and some type of insulating barrier is usually maintained to protect the understructure of the kiln cars. At high temperatures, and especially after repeated runs through a kiln, the heat may cause the wheels, axles, bearings and other portions of the truck and frame assemblies of the cars to deteriorate, warp or otherwise become defective. Additionally, the goods which are transported through the kiln should be dried or fired in the presence of uniform heat throughout the kiln. If cool drafts from the lower regions of the kiln are allowed to reach the goods, they may be adversely affected, such as by incomplete firing or drying, slumping, cracking, etc.

For these reasons, various refractory materials are usually placed on or associated with the kiln car to prevent the transfer of heat from the top of the kiln to the area beneath the load bearing surface of the kiln car and to prevent the transfer of cold air from beneath the kiln car to the area above its load bearing surface. Various shapes of side blocks have been used to prevent heat or cool air from going down or up the side of the kiln to the area below or above the load bearing surface of the kiln car. These side blocks are generally disposed very close to the walls of the kiln or in overlapping relation with portions of the kiln walls to prevent the heat from reaching the underframe of the car and to prevent the cool air from reaching the goods on the car. End seal blocks have been used on the leading and trailing ends of kiln cars to provide a heat seal between adjacent cars. Examples of various arrangements to prevent the transfer of heat from a kiln to the area below the load bearing level of kiln cars are disclosed, for example, in U.S. Pat. No. 379,040 of Anderson, issued Mar. 6, 1888; U.S. Pat. No. 1,072,302 of Boss, issued Sept. 2, 1913; and U.S. Pat. No. 3,363,324 of Martin, issued Jan. 16, 1968.

Conventional end blocks have portions adapted to overlap or abut mating or similar portions of end seal blocks on an adjacent kiln car. If the mating or abutting portions are too close to the corresponding portions of the end seal blocks of an adjacent car, they will tend to become damaged due to contact with one another. If the mating or abutting portions do not come into contact with each other, as in the case in the prior art, there may be unwanted and detrimental heat transfer below and above the level of the load bearing surface of the kiln cars. Furthermore, pressurization of the furnace atmosphere can sometimes overcome the tortuous path.

Various types of interlocking building blocks are known. See, for example, those disclosed in the following U.S. Pat. Nos.: 868,838 of Brewington, issued Oct. 22, 1907; 1,088,040 of Stanton, issued Feb. 24, 1914; 1,162,409 of Shimer, issued Nov. 30, 1915; and 4,003,172 of Pawl, issued Jan. 18, 1977. Moreover, refractory bricks are known wherein portions of the brick interlock with portions of another brick. See, for example, U.S. Pat. Nos. 1,330,249 of Emley, issued Feb. 10, 1920; 1,410,729 of Balz, issued Mar. 28, 1922; 1,925,103 of Loftus et al., issued Sept. 5, 1933 and 2,075,863 of Nash, issued Apr. 6, 1937. U.S. Pat. No. 3,077,703 of Bergstrom, issued Feb. 19, 1963, discloses a roof deck structure having a tongue and groove structure with moisture barrier means associated therewith.

None of these patents disclose an end seal block having the structure or improved function of the end seal block according to the present invention.

SUMMARY OF THE INVENTION

The broadest embodiment of the present invention comprises an end block adapted for use in a kiln car comprising a refractory body having a transverse recess extending into one face of the body, the recess being capable of retaining a [layer of] resilient refractory material therein without the use of fastening means, the innermost portion of the recess having a vertical dimension [greater than] *at least as great as* the vertical dimension of any other portion of the recess, the block [being] *may be* adapted to loosely receive a projection from another block within the recess.

[The] *A* presently preferred embodiment of the invention comprises an end block adapted for use on a kiln car comprising a refractory body having a transverse projection extending from one face thereof and a transverse recess extending into an opposite face thereof, the smallest vertical dimension of the recess being greater than the largest vertical dimension of the projection so that a corresponding projection on another block can enter the recess with a loose fit, the recess being adapted to retain a layer of resilient refractory material therein without the use of fastening means for contact with a projection of another block.

The recess and the projection should have dissimilar configurations. The configuration of the recess is preferably chosen so as to automatically assure that the sealing layer of resilient refractory material is retained in the recess without the use of any fastening means. Thus, a preferred configuration for the recess is a dovetail recess.

It is an object of the present invention to provide an end block which effectively prevents or minimizes the transfer of heat in a kiln from the region above the end block to the region below the end block, and which effectively prevents or minimizes the transfer of cold air from the region below the end block to the region above the end block.

It is another object of the present invention to provide an end block adapted for use on a kiln car which is structurally interrelated in a manner which is simple, inexpensive, and reliable in performing its intended function with minimal damage during use.

Other objects will appear hereinafter.

BRIEF DESCRIPTION OF THE DRAWINGS

For the purpose of illustrating the invention, there is shown in the drawings a form which is presently preferred; it being understood, however, that this invention is not limited to the precise arrangements and instrumentalities shown.

DESCRIPTION OF THE PREFERRED EMBODIMENTS

The left side of the sheet of drawings will be considered the front end of the figures, for uniformity of describing the invention. It is to be understood, however, that the end block according to the present invention has no specific "front" end or "rear" end.

Figure 1:
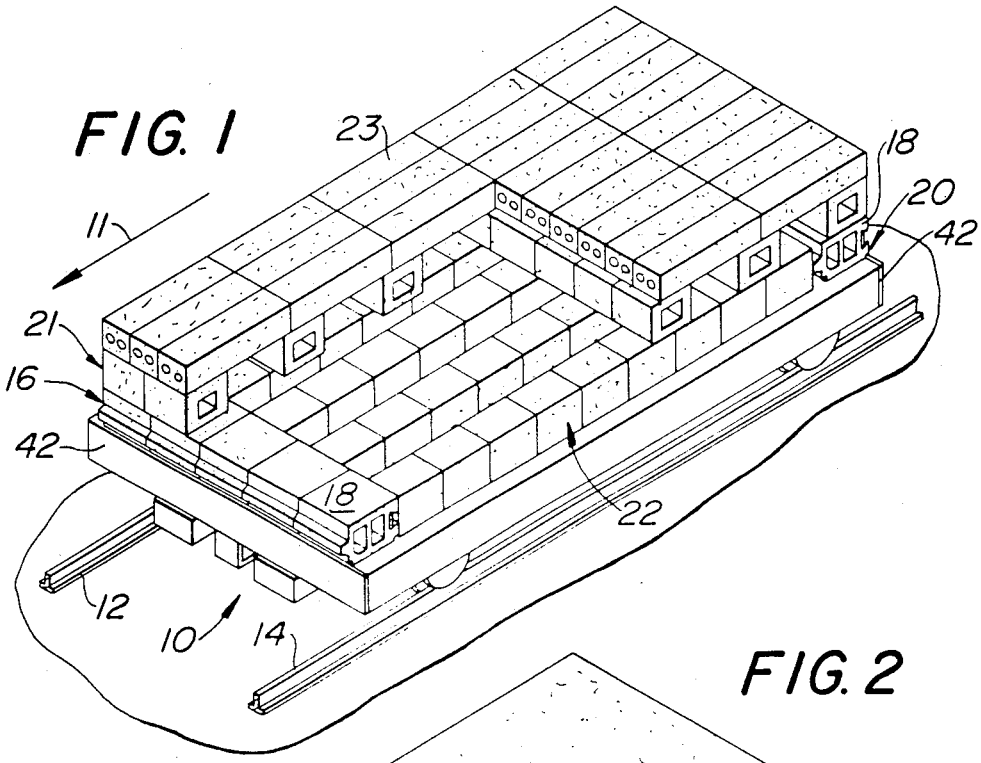
FIG. 1 is a partial perspective view of a kiln car having end blocks according to a preferred embodiment of the present invention disposed on the ends thereof moving on rails through a kiln, the kiln structure not being illustrated.

Referring to the drawings in detail, wherein like numerals indicate like elements, there is shown in FIG. 1 a kiln car designated generally as 10. The kiln car is a substantially flat platform mounted on wheels which ride on tracks 12 and 14. Although either end of kiln car 10 may be the front end, the front end of car 10 is designated to be at the left end of FIG. 1 for purposes of illustration. Thus, the car will move through the kiln in the direction of arrow 11.

The front end of car 10 contains a transverse row 16 of end blocks 18 in accordance with the present invention. The rear end of car 10 is also provided with a transverse row 20 of end blocks 18 in accordance with the present invention. Blocks 18 in each of the rows 16 and 20 are aligned in the same direction and are identical. By providing blocks which are identical in configuration, the inventory of blocks having different shapes can be substantially reduced. Although presently preferred, it is not essential that the blocks have identical shapes.

A plurality of rows 22 of spacer blocks extend between the transverse rows 16 and 20. These spacer blocks are of the same height as the end blocks 18. Goods, such as bricks 23 to be dried, can be supported directly on the blocks of rows 16, 20 and 22. If desired, intermediate transverse support rows of blocks 21 may be provided for supporting the bricks thereabove as illustrated in FIG. 1. The spaces between the rows of supporting blocks allow for the circulation of heat around the goods being transported through the kiln.

Figure 2:
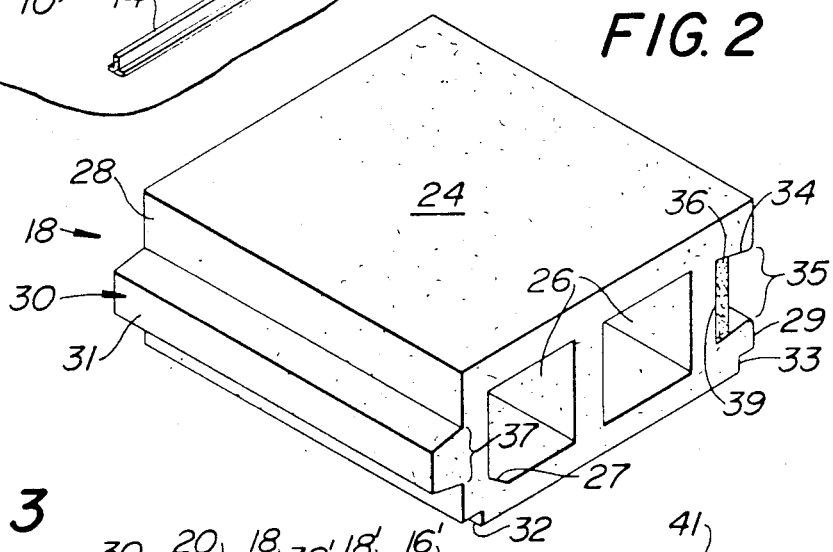
FIG. 2 is a perspective view of an end block according to a preferred embodiment of the present invention as used on the kiln car shown in FIG. 1, but on an enlarged scale.

As shown more clearly in FIG. 2, each of the blocks 18 includes a refractory body 24 which may be solid or hollow. Hollow blocks are preferred, being lighter and less expensive to make, since less material is being used. If body 24 is hollow, it is preferred to provide the body with one or more openings 26 generally parallel to the front and rear faces of the block as shown in FIG. 2.

Body 24 has a front face 28. A projection 30 extends transversely across front face 28 at approximately the middle of the elevation of front face 28. In section, projection 30 preferably corresponds to a trapezoid as illustrated so as to terminate in a vertically disposed surface 31 which is parallel to front face 28. A notch 32 is preferably provided at the bottom edge of the front face 28. The notch allows block 18 to be disposed over end plate 42 of kiln car 10. As shown most clearly in FIG. 2, the front most opening 26 is bevelled at its corner 27 adjacent to notch 32.

A recess 34 extends into and transversely across rear end face 29 of block 24 at approximately the middle of the elevation of end face 29. The dimensions of recess 34 are such that the recess will receive a projection 30 on an end block of an adjacent kiln car with a loose fit. "Loose fit" or "loosely receive" means there is no contact between recess 34 on one block 18 and projection 30 on an adjacent block 18 when projection 30 is placed within recess 34. There should be a minimum clearance of at least about $\frac{1}{4}$ inch and preferably about $\frac{3}{8}$ inch between the surface of projection 30 and the closest surface of recess 34.

To avoid breaking, chipping or other damage to the end blocks by a tight, interlocking mating fit between a projection of one end block with the structure forming the recess in the adjacent end block of an adjacent kiln car, the smallest vertical dimension 35 of recess 34 should be greater than the largest vertical dimension 37 of projection 30. The recess 34 should have a cross-sectional shape which is different from the shape of projection 30, so that the projection and recess will not interlock. Another notch 33 may be provided in the bottom edge of rear face 29 for the same purpose served by notch 32 in front face 28.

The recess should also be shaped so that a layer of resilient refractory material 36 can be retained in the recess preferably by means of the compressible nature of the resilient refractory material 36 and the retaining shape of recess 34. Thus, recess 34 should be shaped to be adapted to retain material 36 therein without fasteners, such as adhesives, nails, screws, staples or the like to allow for the easy changing of material 36. Innermost portion 39 of recess 34 has a vertical dimension greater than the vertical dimension of any other portion of the recess. Preferably, the portion 35 of the recess which is flush with face 29 of the block has the smallest vertical dimension. The recess may be formed in any other manner whereby it may be able to retain the resilient refractory material 36 without the use of fasteners. The preferred cross-sectional shape of of recess 34 is a dovetail. Material 36 is firmly retained in a dovetail shaped recess without fasteners.

A layer of resilient refractory material 36 is disposed within recess 34 and maintained therein solely by the shape of recess 34 and the compressibility of material 36. Material 36 is disposed against innermost surface 39 of recess 34. Projection 30 of a block on an adjacent kiln car is adapted to contact material 36 in recess 34 to provide a seal against hot or cold air transfer below or above the level of blocks 18. Any suitable refractory material may be utilized for material 36 so long as it is sufficiently resilient to cushion projection 3) of block 18 on an adjacent kiln car and can withstand the temperatures of the kiln in which the kiln car is to travel. For example, suitable ceramic fiber blankets are commercially available from Babcock and Wilcox Company under the trademark Kaowool, from Carborundum Company under the trademark Fibrefrax and from Johns-Manville Products Corporation under the trademark Cerablanket. Material 36 is in the form of an aluminasilica blanket which will withstand temperatures up to about 2300° F. Other ceramic fiber blankets are available that can withstand temperatures up to 2600° F. The thickness of material 36 is preferably between about ½ inch and about 1½ inches. Material 36 should have a density of about 6 to about 12 pounds per cubic foot to provide the desired resiliency, compressibility and cushioning properties when in use.

Figure 3:
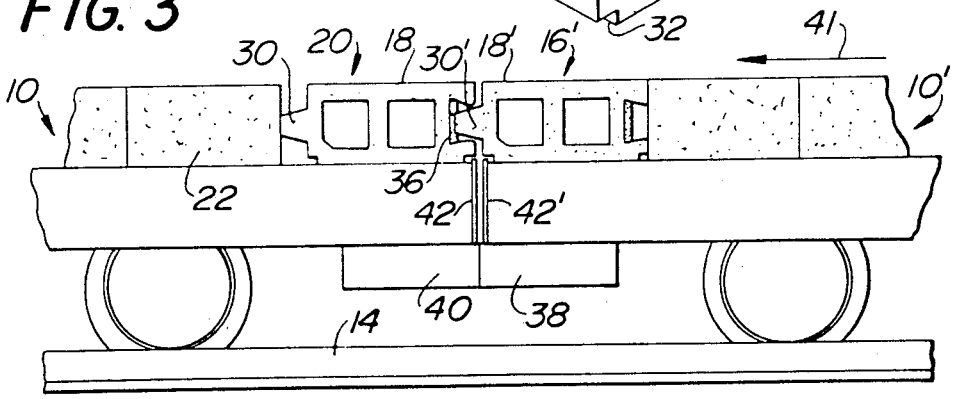
FIG. 3 is a side elevation view of the rear end of a leading kiln car and the front end of a trailing kiln car, with end blocks according to a preferred embodiment of the present invention on their respective cars being in sealing contact with each other.

In FIG. 3, for purposes of illustrating the end blocks of the invention in use, there is shown the rear end of car 10 and the front end of a car 10'. The cars are travelling in the direction of arrow 41. The cars are dimensioned so as to minimize transfer of heat between the cars and the sidewalls of the kiln in a conventional manner. As the cars 10 and 10' move through the kiln, the front bumper 38 on car 10' is in contact with the rear bumper 40 on car 10. At the same time, surface 31 of projection 30' of block 18' in the front row 16' on car 10' enters recess 34 on the juxtaposed block 18 forming a part of row 20 on the rear end of car 10.

Contact between bumpers 38 and 40, secured to the underframe of kiln cars 10 and 10' respectively by any suitable means, prevents contact between projection 30 and any portion of the block defining recess 34 except for contact with resilient refractory material 36. One long piece of resilient refractory material 36 having a height sufficient to be retained in recesses 34 is threaded through all of the aligned recesses in the blocks forming row 20 at once. This is the preferred manner of inserting material 36 in the row of blocks. However, an alternative suitable method includes inserting material 36 in the recess 34 of each block 18 and then aligning the blocks in row 20.

Blocks 18 and 18' are so dimensioned and placed on cars 10 and 10', respectively, to avoid block-block contact. Thus, bumpers 38 and 40 are used to push the cars through the kiln. Notch 32' on blocks 18' enables the blocks of row 16' to project over end plate 42. If desired, row 20 of blocks 18 could be shifted toward the rear of car 10 so that notch 33 in each block 18 projects over the rear end plate 42'.

As set forth hereinbefore, car 10' may be considered the leading car going in a direction opposite to the direction indicated by arrow 41. Then, row 20 would be on the front end of car 10 and row 16' would be on the rear end of car 10'.

The dimensions of blocks 18 may be varied within a substantial range. Typical dimensions follow. Blocks 18 have a preferred height of approximately 8½ inches but the height may vary between about 4½ and about 12 inches. The width of the blocks including the projection 30 is preferably about 10 inches but may vary between about 8 inches and about 15 inches. The length of the blocks depends on the width of the kiln car and the number of blocks desired to be placed on the leading and trailing ends thereof. Typical lengths vary between about 12 and about 18 inches. Projection 30 preferably extends from front face 28 to surface 31 for a distance of about 1⅜ inches but may extend up to about 2⅛ inches. The smallest vertical dimension of projection 30 at front face 31 is about 2 inches. The greatest vertical dimension of projection 30 at 37 is about 2½ inches which is smaller than the smallest vertical dimension of any portion of recess 34. The smallest vertical dimension 35 of recess 34 is preferably at the rear face of block 18 and is preferably 3 inches but may vary between about 2 inches and about 4 inches. The vertical dimension of recess 34 at the innermost surface thereof is preferably 3½ inches but may vary between about 2½ and about 4½ inches. Recess 34 has a preferred depth (from face 29 to innermost surface 39) of about 1½ inches but it may vary between about about 1½ inches and about 2¼ inches.

The block illustrated in FIG. 2 is the preferred form of block according to the present invention. However, the concept of the present invention is to provide effective sealing between end blocks of adjacent kiln cars. This is accomplished by providing a row of end blocks each having an appropriately shaped recess as described herein capable of retaining therein a resilient refractory material without the use of fasteners. Each block need not have both a projection on one end aand a recess on the other. Rather, one shape of block can have a transverse recess in an end face and a simple vertical surface on the end face opposite the end face containing the recess. The recess would be disposed adjacent the end of one kiln car. An adjacent car would have a row of blocks each comprising a refractory body with two end faces, one being vertical and the opposite one having a transverse projection extending beyond the end of a car. The projections on these blocks are adapted to loosely fit within the recesses in the row of blocks on the adjacent car.

End blocks 18 may be made from any one of a variety of standard refractory materials. The end blocks are preferably made from andalusite-pyrophyllite ore with fireclay binder in a manner well known to those skilled in the art. The usual method of making the blocks is by extrusion, however, molding may also be a suitable method.

The present invention may be embodied in other specific forms without departing from the spirit or essential attributes thereof and, accordingly, reference should be made to the appended claims, rather than to the foregoing specification, as indicating the scope of the invention.

I claim:

1. An end block designed for use on a kiln car comprising a refractory body having top and bottom horizontally disposed major faces and two vertically disposed end faces, a transverse projection extending from end face thereof generally parallel to said major faces and a transverse recess extending into an opposite end face thereof, said recess having means for retaining a layer of resilient refractory material therein without the use of fastening means for contact with a corresponding projection of another block, said retaining means comprising the shape of said recess such that the innermost surface of said recess has a vertical dimension greater than the vertical dimension of [any other] *another* portion of said recess and whereby the smallest vertical dimension of said recess is greater than the largest vertical dimension of said projection so that said corresponding projection of another block can enter said recess with a loose fit, and said projection having a cross-sectional shape different from the cross-sectional shape of said recess.

2. A block in accordance with claim 1 wherein said recess has a dovetail cross-sectional shape and said cross-sectional shape of said projection is a trapezoid having its largest vertical dimension where said projection joins said body.

3. A block in accordance with claim 1 wherein said body is provided with at least one opening therethrough extending in a direction generally parallel to said end faces of said body.

4. A block in accordance with claim 1 wherein said body has a notch in at least one edge at the intersection of said bottom major face and said end faces.

5. A block in accordance with claim 1 wherein the outermost surface portion of said projection and the innermost surface portion of said recess are generally paralel to said end faces of said block.

6. A block in accordance with claim 1 wherein said projection extends from said one end face at approximately the middle of the elevation thereof, said projection having converging top and bottom surfaces extending to a vertical surface, and wherein said recess is at about the same elevation as said projection and has a dovetail vertical cross-sectional shape.

7. A block in accordance with claim 1 wherein said block is made of refractory material comprising andalusite-pyrophyllite ore with a fire clay binder.

8. A block in accordance with claim 1 further comprising a layer of resilient refractory material retained in said recess by means for retaining said layer comprising said shape of said recess.

9. A block in accordance with claim 8 wherein said layer of resilient refractory material is a ceramic fiber blanket.

10. A block in accordance with claim 8 wherein said layer of resilient refractory material is a refractory aluminasilica fiber blanket having a thickness of about one-half to about one and one-half inches.

11. An end block designed for use on a kiln car comprising a refractory body having top and bottom horizontally disposed major faces and two vertically disposed end faces, and a transverse recess extending into one end face of said body, said recess having a shape wherein the innermost surface of said recess has a vertical dimension [greater than] *at least as great as* the vertical dimension of any other portion of said recess, and [a layer of] resilient refractory material is retained in said recess by means for retaining said [layer] *resilient refractory material* therein without the use of fastening means, said retaining means comprising said shape of said recess.

* * * * *